(12) United States Patent
Shi et al.

(10) Patent No.: US 7,783,074 B2
(45) Date of Patent: Aug. 24, 2010

(54) APPARATUS AND METHOD FOR STEGANALYSIS

(75) Inventors: Yun-Qing Shi, Millburn, NJ (US); Guorong Xuan, Shanghai (CN)

(73) Assignee: New Jersey Institute of Technology, Newark, NJ (US)

( * ) Notice: Subject to any disclaimer, the term of this patent is extended or adjusted under 35 U.S.C. 154(b) by 63 days.

(21) Appl. No.: 12/391,014

(22) Filed: Feb. 23, 2009

(65) Prior Publication Data
US 2009/0154797 A1 Jun. 18, 2009

Related U.S. Application Data

(63) Continuation of application No. 11/340,419, filed on Jan. 25, 2006, now Pat. No. 7,496,210.

(60) Provisional application No. 60/646,972, filed on Jan. 26, 2005.

(51) Int. Cl.
*G06K 9/00* (2006.01)
(52) U.S. Cl. .................. 382/100; 382/168; 382/250
(58) Field of Classification Search ............. 382/100, 382/168, 250
See application file for complete search history.

(56) References Cited

U.S. PATENT DOCUMENTS

| 6,975,733 | B1 | 12/2005 | Choi et al. |
| 6,983,057 | B1 | 1/2006 | Ho et al. |
| 7,280,669 | B2 | 10/2007 | Choi et al. |
| 2007/0074026 | A1 | 3/2007 | Hicks |
| 2007/0189608 | A1 | 8/2007 | Shi et al. |
| 2007/0258618 | A1 | 11/2007 | Shi et al. |

OTHER PUBLICATIONS

Harmsen, Steganalysis of Additive Noise Modelable Information Hiding, Apr. 2003, Rensselaer Polytechnic Institute, pp. 1-50.
Farid, Detecting hidden messages using higher-order statistical models, 2002, IEEE, volumn 2, pp. 905-908.

*Primary Examiner*—John B Strege
(74) *Attorney, Agent, or Firm*—Connolly Bove Lodge & Hutz LLP

(57) ABSTRACT

An apparatus and method for steganalysis that enhances the ability to detect distortion introduced by data hiding. In embodiments of the invention, a pixel grayscale value in an image is predicted by using its neighboring grayscale values of neighboring pixels. Further, a prediction-error image is produced by subtracting the image from its predicted image. The prediction-error image may be employed to remove at least some variations in image data other than those associated with data hiding an thus, at least partially offsets variations from image aspects other than data hiding.

31 Claims, 8 Drawing Sheets

FIG. 1
FIG 2A
FIG. 2B     FIG. 2C
 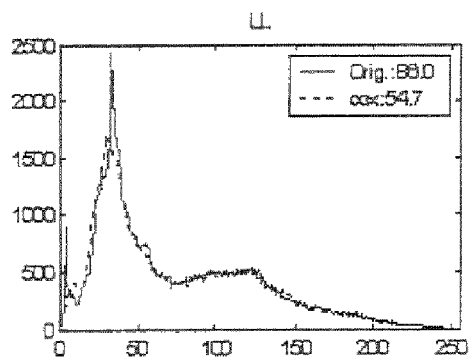
FIG. 3
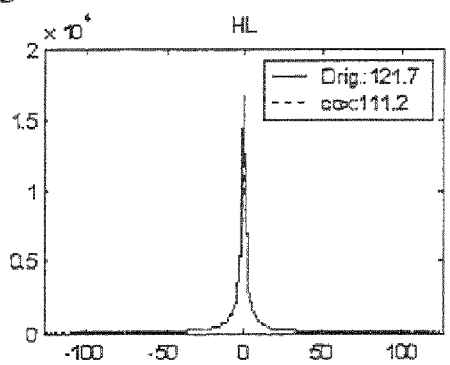 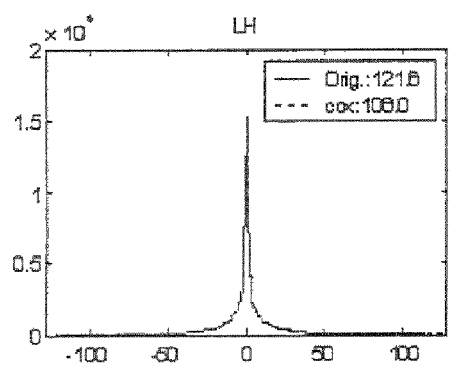
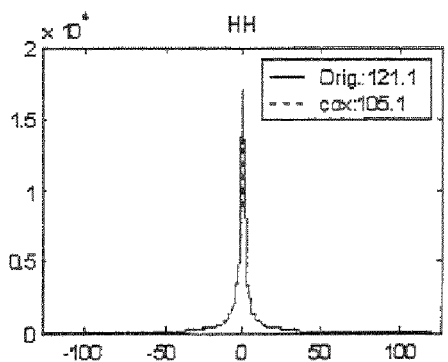

Input  Hidden  ...  Hidden  Output
       Layer 1       Layer n

FIG. 10
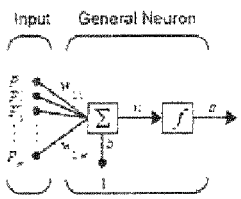
FIG. 11A
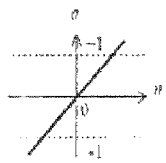
FIG. 11B
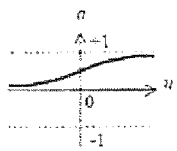
FIG. 11C
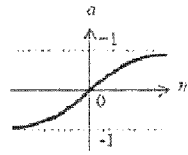
FIG. 12
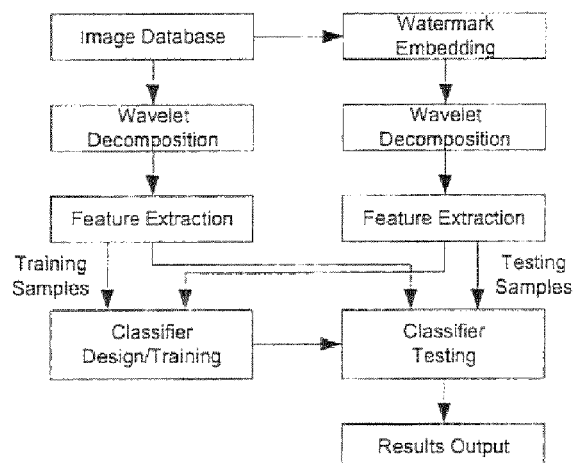
FIG. 13
| Detection rate | Farid | Harsmen | Embodiment |
|---|---|---|---|
| Cox et al.'s SS | 64.9% | 78.3% | 98.1% |
| Piva et. al's SS | 87.8% | 79.4% | 98.7% |
| Huang and Shi' block SS | 76.1% | 81.5% | 98.8% |
| Generic QIM (0.1 bpp (bits per pixel)) | 99.7% | 75.7% | 99.0% |
| Generic LSB (0.3 bpp) | 71.9% | 56.5% | 98.9% |
| 5 methods combined | 68.9% | 72.8% | 98.7% |

| Detection rate | 39 features (original image) | 39 features (prediction-error image) |
|---|---|---|
| Cox et al.'s SS | 96.2% | 96.6% |
| Piva et. al's SS | 95.2% | 98.8% |
| Huang and Shi's block SS | 95.4% | 97.9% |
| Generic QIM (0.1 bpp) | 97.9% | 98.7% |
| Generic LSB (0.1 bpp) | 94.5% | 98.7% |

| Detection rate | Bayes classifier | Neural network classifier |
|---|---|---|
| Cox et al.'s SS | 95.2% | 98.1% |
| 5 methods combined | 94.6% | 98.7% |

APPARATUS AND METHOD FOR STEGANALYSIS

BACKGROUND

This application is related to hiding information in content, such as images, video, audio, etc.

In recent years, digital watermarking has emerged as an increasingly active research area. Information may be hidden in images, videos, and audios in a manner imperceptible to human beings. It provides vast opportunities for covert communications. Consequently, methods to detect covert communication are desired. This task is desired, for example, for law enforcement to deter the distribution of child pornography and for intelligence agencies to intercept communications between terrorists. Steganalysis, in this context, refers to detecting whether given set of content, such as an image, has data hidden in the content. On the other hand, steganalysis can serve as an effective way to judge the security performance of steganographic techniques. In other words, a steganographic method should be imperceptible not only to human vision systems, but also to computer analysis.

Images are a common form of content in which data may be hidden. The diverse nature of natural images and the variation of data embedding approaches make steganalysis difficult. However, a cover medium and an associated stego-version, referring here to the cover medium with data hidden therein, generally differ in some respect since the cover medium is generally modified by data embedding Some data hiding methods may introduce a certain pattern in stego-images. For example, in J. Fridrich, M. Goljan and D. Hogea, "Steganalysis of JPEG Images: Breaking the F5 Algorithm", 5th Information Hiding Workshop, 2002, pp. 310-323, (hereinafter, Fridrich et al.), Fridrich et al. have discovered that the number of zeros in the block DCT (Discrete Cosine Transform) domain of a stego-image can decrease if the F5 embedding method is applied to the stego-image. This feature may therefore be used to determine whether hidden messages are embedded using F5 embedding. There are other findings involving steganalysis which are directed to particular data hiding methods. See, for example, J. Fridrich, M. Goljan and R. Du, "Detecting LSB Steganography in Color and Gray-Scale Images", Magazine of IEEE Multimedia Special Issue on Security, October-November 2001, pp. 22-28; R. Chandramouli and N. Memon, "Analysis of LSB Based Image Steganography Techniques", Proc. of ICIP 2001, Thessaloniki, Greece, Oct. 7-10, 2001. However, the particular data embedding method is often not known before conducting steganalysis. A method designed to blindly (without knowing which data hiding method was employed) detect stego-images is referred to as a general steganalysis method. From this point of view, general steganalysis methods have value for deterring covert communications.

In H. Farid, "Detecting hidden messages using higher-order statistical models," Proceedings of the IEEE Int'l. Conf. on Image Processing 02, vol. 2, pp. 905-908, (hereinafter, Farid), Farid proposed a general steganalysis method based on image high order-statistics. The statistics are based on decomposition of an image with separable quadrature mirror filters, or wavelet filters. The sub-bands' high order statistics are obtained as features for steganalysis. This method was shown to differentiate stego-images from cover media with a certain success rate. In J. Harmsen, W. Pearlman, "Steganalysis of Additive Noise Modelable Information Hiding", SPIE Electronic Imaging, Santa Clara, January 2003, pp. 20-24, (hereinafter, Harmsen), a steganalysis method based on the mass center (the first order moment) of a histogram characteristic function is proposed. The second, third, and fourth order moments are also considered for steganalysis.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and/or advantages thereof, may best be understood by reference of the following detailed description if read with the accompanying drawings in which:

FIG. 1 is an illustration of an embodiment of a prediction process, such as may be applied to images, for example;

FIG. 2A is a sample cover image;

FIG. 2B is a grayscale version of the image shown in FIG. 2A;

FIG. 2C is a prediction image of the image shown in FIG. 2B;

FIG. 3 is four histograms of the four sub-bands of the image shown in FIG. 2B;

FIG. 10 is a schematic diagram of an embodiment of a neuron structure;

FIGS. 11A, 11B, and 11C are graphs of activation functions that may be employed with the embodiment of FIGS. 9 and 10;

FIG. 12 is a flowchart of an embodiment of a method for steganalysis;

FIG. 13 is a data table comparing results obtained employing selected steganalysis methods;

DETAILED DESCRIPTION

Figure 4:
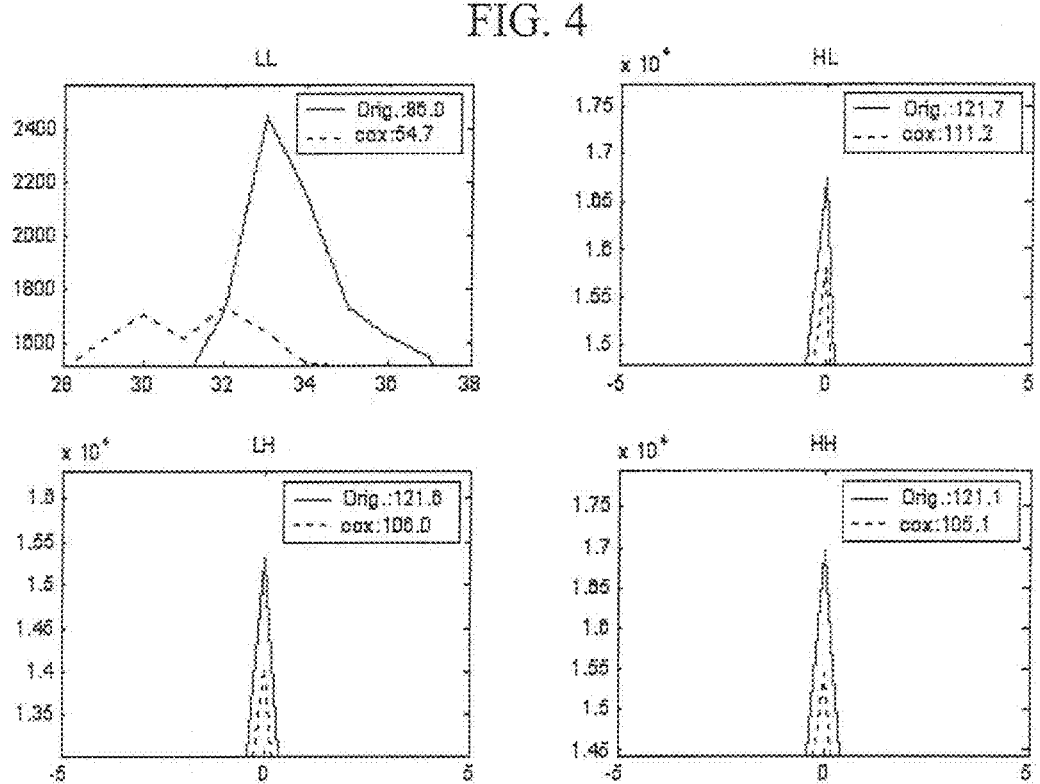
FIG. 4 is four magnified views of respective regions of interest of the histograms of FIG. 3.

Because the dimensionality of content, such as image data, for example, is normally large, it may be difficult to directly use the content itself for steganalysis. A feasible approach is to extract a certain amount of data from the content, such as, for example, images, and to use the extracted data to represent the content or image for steganalysis. In other words, this extracted data may correspond to features of an image, for example. Likewise, identifying those features of an image to employ for steganalysis may be desirable.

In the area of facial recognition, for example, selected features may reflect the shape of a target face in an image, e.g., the main content of the image. However, in steganalysis, the main content of an image, for example, is usually not an issue to be considered. The difference between an image and its stego-version is generally not perceptible to the naked human eye. However, those minor distortions introduced during data hiding may be useful. Therefore, features selected for steganalysis are selected to reflect minor distortions associated with data hiding.

The histogram of an image may be characterized as the probability density function (PDF) of an image, if the grayscale level of the image is treated a random variable. In other words, the PDF of an image is a normalized version of the image's histogram, hence there may be a scalar adjustment between the PDF and the histogram. According to A. Leon-Garcia, Probability and Random Processes for Electrical Engineering, $2^{nd}$ Edition, Reading, Mass.: Addison-Wesley Publishing Company, 1994, pages 145-148, one interpretation of a characteristic function is that it is simply the Fourier transform of the PDF (with a reversal in the sign of the exponent).

Owing to the de-correlation capability of the discrete wavelet transform (DWT), the coefficients of different sub-bands at the same level are generally independent of one another. Therefore, features generated from different wavelet sub-bands at the same level are generally independent of one another. This aspect may be desirable for steganalysis.

For example, in one embodiment of claimed subject matter, statistical moments of CFs of an image and its wavelet sub-bands may be employed as features for steganalysis, although claimed subject matter is not limited in scope in this respect. For example, for this particular embodiment, a statistical moment may be defined as follows.

$$M_n = \sum_{j=1}^{(N/2)} f_j^n |H(f_j)| \bigg/ \sum_{j=1}^{(N/2)} |H(f_j)| \quad (1)$$

where $H(f_j)$ is the characteristic function at frequency $f_j$. The DC component of the characteristic function, e.g., $H(f_0)$, may be omitted from the calculation of the moments, at least for this particular embodiment. It represents the summation of components in the histogram and generally does not reflect changes from data hiding.

As mentioned previously, the PDF and the histogram generally differ by a scalar quantity. Thus, a histogram, denoted by h(x), may be employed in place of the PDF. Likewise, the histogram is the inverse Fourier transform, as previously mentioned, of the CF, H(f). Thus, the following relationship may be obtained:

$$\left| \left( \frac{d^n}{dx^n} h(x) \bigg|_{x=0} \right) \right| = \left| (-j2\pi)^n \int_{-\infty}^{\infty} f^n H(f) df \right| \quad (2)$$
$$\leq 2(2\pi)^n \int_0^{\infty} f^n |H(f)| df$$

Thus, the $n^{th}$ moments of CF may be related to the magnitude of the $n^{th}$ derivative of the histogram up to a scalar. Likewise, the $n^{th}$ moments of CF may be related to changes to a histogram arising from data hiding.

By way of illustration, consider the following two cases, which cover the sub-bands involved in steganalysis. The first case includes $LL_i$, with i=0, 1, 2, 3. Here, the image is denoted by $LL_0$. That is, the image, and the LL sub-bands in the three-level DWT decomposition may be considered. The second case includes high frequency sub-bands, e.g., $LH_i$, $HL_i$, $HH_i$, with i=1,2,3.

Case 1: Assume the noise introduced by data hiding is additive and Gaussian, and is independent of the cover image. This assumption is valid for most data hiding methods. In fact, for three of the major types of data hiding techniques, e.g., the spread spectrum (SS) method, the least significant bit-plane (LSB) method, and the quantization index modulation (QIM) method, the assumption is valid. It is well-known that the PDF of the sum of two independent random signals is the convolution of the PDFs of the two signals. Hence, the histogram of the stego-image, is expected to be flatter than that of the original image.

This type of change may potentially be perceived and used in steganalysis. As suggested, the $n^{th}$ moments in this embodiment are a measure of the magnitude of the $n^{th}$ derivative of the histogram at the origin (x=0). Therefore, defined features may detect changes in the flatness of a histogram resulting from the data embedding. $LL_i$ sub-bands as i=1,2,3 are low-frequency-pass-filtered versions of the image. Hence, defined moments may detect changes in the flatness of the histograms of these sub-bands as well.

Case 2: For high frequency sub-bands, e.g., $LH_i$, $HL_i$, $HH_i$, i=1,2,3, DWT coefficients have mean values around x=0. Therefore, the histogram may be Laplacian-like. As shown by Equation (2), the $n^{th}$ moments of the characteristic function represent the magnitude of the $n^{th}$ derivatives of the histogram at x=0. Thus, moments, or features, may potential detect changes occurring at a peak of the histogram. As demonstrated in more detail below, experimental results indicate that a peak point is sensitive to data embedding. Thus, this particular embodiment may provide an effective method of data embedding detection.

In steganalysis, distortion associated with data hiding process may be useful as a detection mechanism. However, this type of distortion may be weak and may interfere with image variation from other sources, including those due to peculiar features of the image itself. To enhance the ability to detect distortion introduced by data hiding, in this particular embodiment, a pixel grayscale value in the original cover image is predicted by using Its neighboring pixels' grayscale values. This produces, for this embodiment, a prediction-error image by subtracting the image from its predicted image. It is expected that this prediction-error image may be employed to remove at least some variations in image data other than those associated with data hiding. In other words, a prediction-error image may be applied to at least partially offset variations from image aspects other than data hiding.

For this embodiment, a prediction process as follows may be applied:

$$\hat{x} = \begin{cases} \max(a, b) & c \leq \min(a, b) \\ \min(a, b) & c \geq \max(a, b) \\ a + b - c & \text{otherwise} \end{cases} \quad (4)$$

where a, b, and c represent the context of the pixel x under consideration, and $\hat{x}$ is the prediction value of x, although claimed subject matter is not limited in scope to this particular prediction process. The location of a, b, c for relationship (4) is shown in FIG. 1.

To experimentally evaluate the embodiment previously described, graphs are employed below to consider selecting moments of characteristic functions. In FIG. 2A, an original image from a CorelDraw™ image database, available from CorelDRAW™ Version 10.0 software, this particular one having serial no. 173037, is shown. A grayscale image of the image in FIG. 2A obtained using an irreversible color transform is shown in FIG. 2B. FIG. 2C is a prediction image generated using the embodiment previously described.

Figure 5:
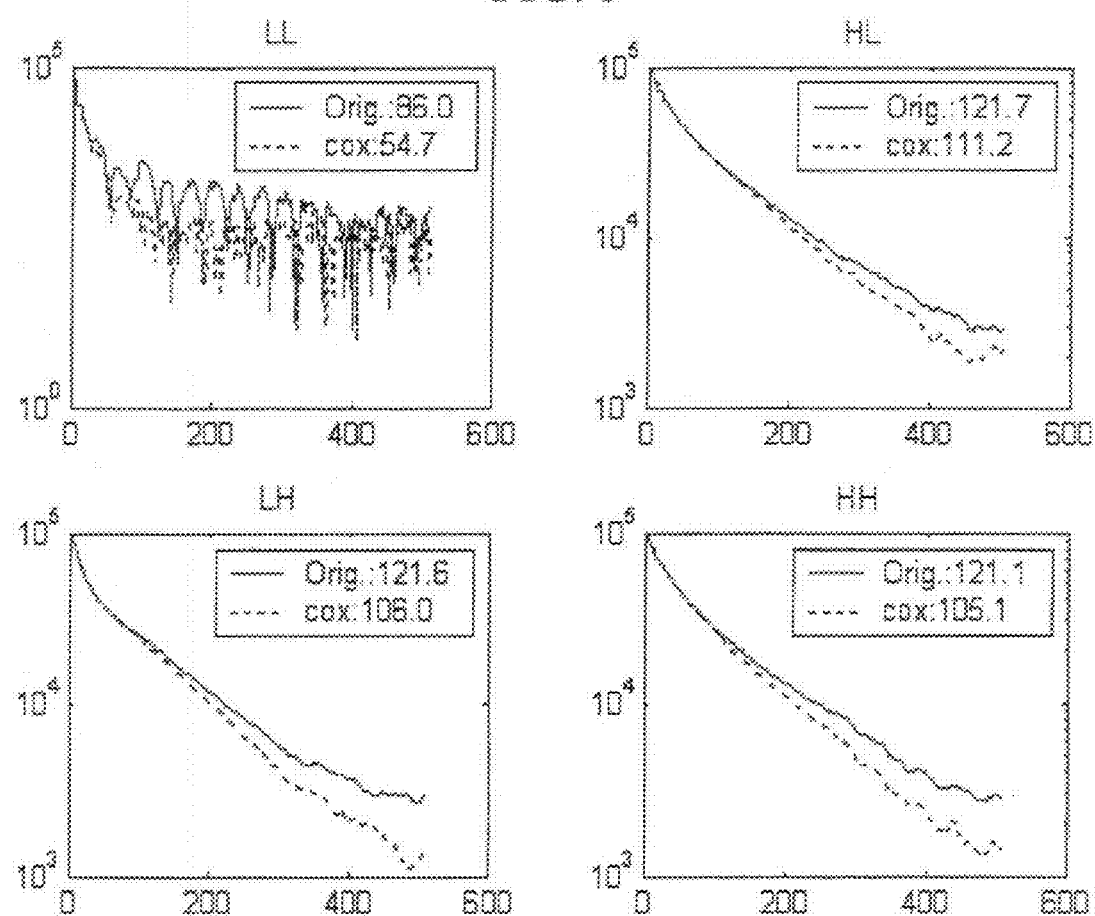
FIG. 5 is four plots of the characteristic functions of the four sub-bands shown in FIGS. 3 and 4.

Histograms of the four sub-bands at the $1^{st}$ level Haar wavelet transform are shown in FIG. 3. FIG. 4 shows an expansion of an area of interest in FIG. 3. The CF of these four sub-bands are shown in FIG. 5. In these FIGS, the abbreviation "Orig." refers to the image shown, while the word "cox" identifies a stego-image produced from the image using Cox et al.'s method. See I. J. Cox, J. Kilian, T. Leighton and T. Sharnoon, Secure Spread Spectrum Watermarking for Multimedia, IEEE Trans. on Image Processing, 6, 12, 1673-1687, (1997). The two numbers shown in the upper right hand corner of the plots are the $1^{st}$ order moment of the corresponding CF for those images.

Figure 6:
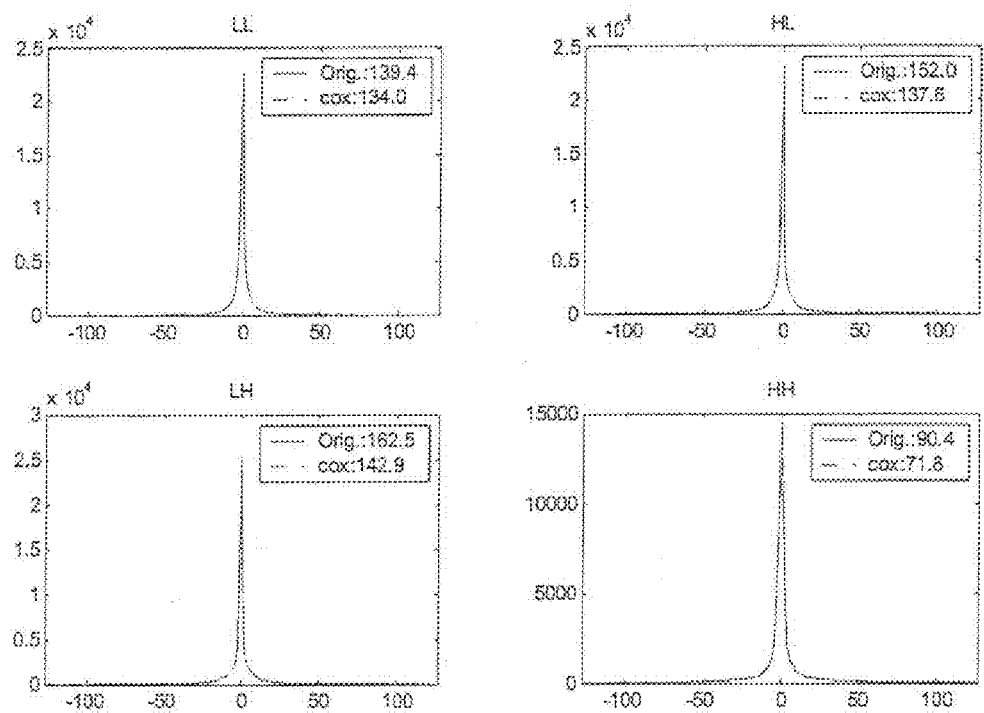
FIG. 6 is four histograms for the four sub-bands for the image shown in FIG. 2C.
Figure 7:
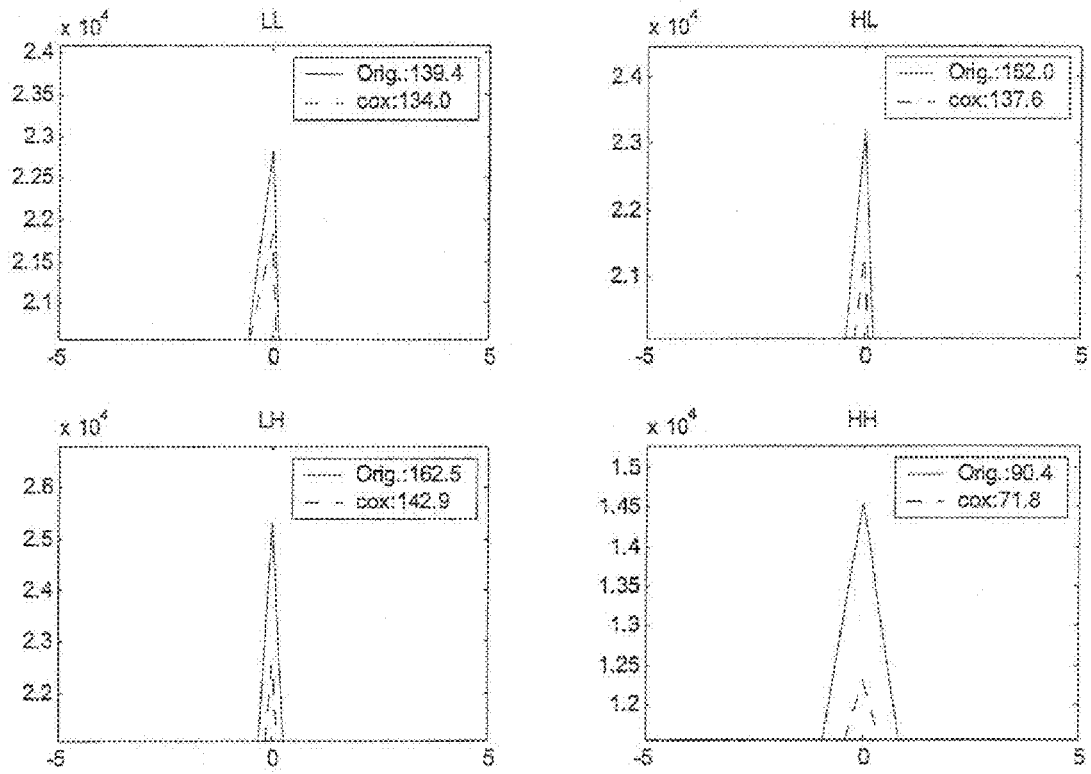
FIG. 7 is four magnified views of respective regions of interest of the histograms of FIG. 6.
Figure 8:
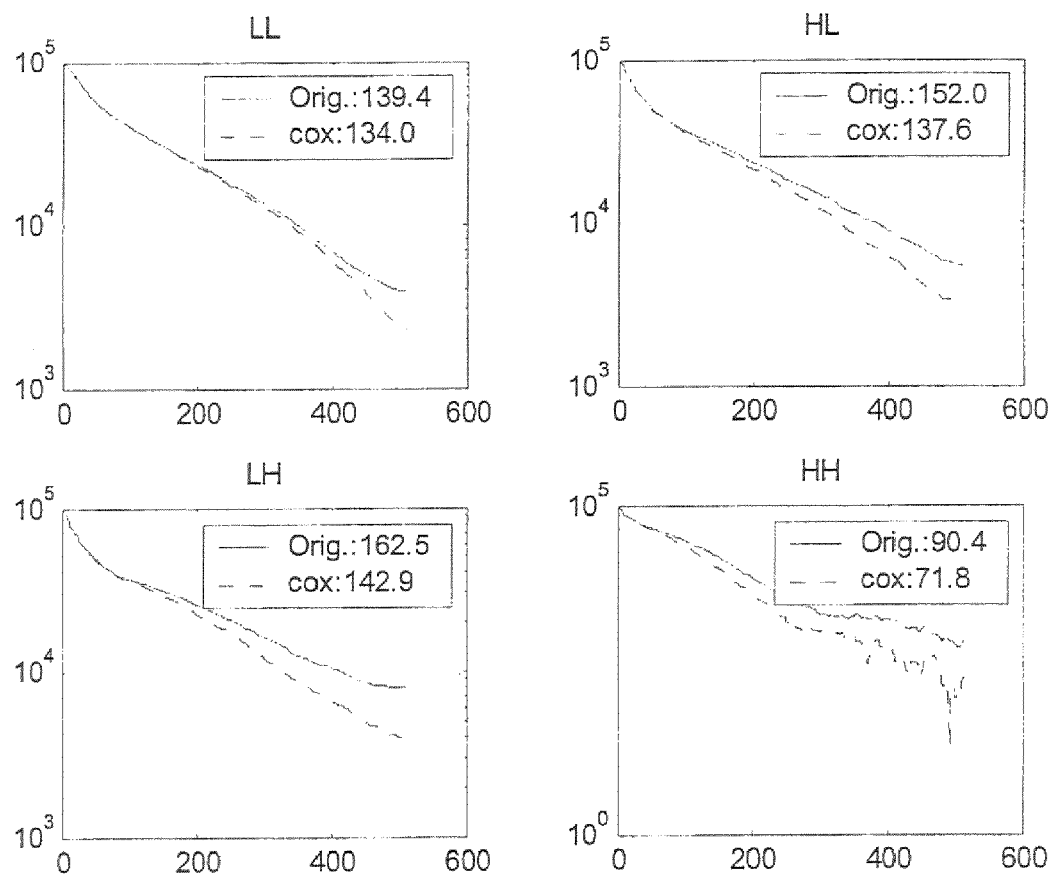
FIG. 8 is four plots of the characteristic functions of the four sub-bands shown in FIGS. 6 and 7.

It is observed that the histograms become flatter (see FIG. 4) after data hiding, and this may be reflected by moments, thus illustrating the effectiveness of moments as features. Similarly, FIGS. 6-8 provide illustrations for prediction-error images, and similar observations may be made in connection with those FIGS.

For one particular embodiment, although claimed subject matter is not limited in scope in this respect, an image may be decomposed using a three-level Haar transform, for example. For a level, there are four sub-bands, as discussed above. Therefore, this decomposition would produce 12 sub-bands in total. If the original image is considered to include a level-0 LL sub-band, a total of 13 sub-bands is produced. For a sub-band, the first three moments of the characteristic functions may be obtained. Similarly, for a prediction-error image, another set of 39 features may be generated. Thus, such an approach would produce a 78-D feature vector for an image, although, again, claimed subject matter is not limited in scope in this respect.

A variety of techniques are available to analyze data, here referred to as features, in a variety of contexts. In this context, we use the term "analysis of variance process" to refer to processes or techniques that may be applied so that differences attributable to statistical variation are sufficiently distinguished from differences attributable to non-statistical variation to correlate, segment, classify, analyze or otherwise characterize data based at least in part on application of such processes or techniques. Examples, without intending to limit the scope of claimed subject matter includes: artificial intelligence techniques and processes, including pattern recognition; neutral networks; genetic processes; heuristics; and support vector machines (SVM). Thus, claimed subject matter is not limited in scope to a particular technique or approach.

Likewise, such techniques are employed in this particular embodiment to distinguish between content, such as images, in which data is hidden and content, such as images, in which data is not hidden. In this context, this shall be referred to as classification or application of a classifier. Thus, selection and design of a classifier may vary and claimed subject matter is not limited in scope in this respect. For this particular embodiment, however, an artificial neural network based classifier may be employed. See, for example, C. M. Bishop, Neural Network for Pattern Recognition, Oxford, N.Y., 1995. However, claimed subject matter is not limited in scope in this respect. However, in another embodiment, a Bayes classifier may be employed, for example.

Figure 9:
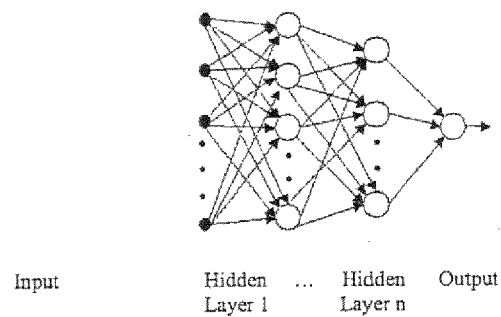
FIG. 9 is a schematic diagram of an embodiment of neural network structure.

A feed forward neural network (NN) with a back-propagation training process may be employed, for example. A NN embodiment is shown in FIG. 9, in which n=5 and the neuron structure embodiment for this NN is shown in FIG. 10. This particular NN embodiment comprises a three layer feed forward NN with one output layer and two hidden layers. The activation function "f" can be any one of the forms shown in FIGS. 11A, 11B, and 11C. This may be implemented, for example, using the toolbox in Matlab 6.5, a commercially available software package, although claimed subject matter is not limited in scope in this respect.

For this particular NN embodiment, hidden neurons may use the tan-sigmoid function. For a one-neuron output layer, all three activation functions (linear, log-sigmoid, and tan-sigmoid) have been tested in the simulation, using Matlab 6.5, as mentioned. In the training stage, output results of log-sigmoid and tan-sigmoid neurons may have larger MSE (Mean Squared Error) than a linear neuron. Likewise, in the testing stage, linear neuron may provide a higher classification rate than the non-linear outputs. Therefore, in one embodiment, a reasonable structure comprises two tan-sigmoid neuron hidden layers and one linear neuron output layer, although claimed subject matter is not limited in scope in this respect.

A back-propagation process was used to train the network. As mentioned previously, computation programming is based on the neural network toolbox of Matlab6.5™. A flowchart of an embodiment of a steganalysis scheme is depicted in FIG. 12, although, again, claimed subject matter is not limited in scope in this respect.

To evaluate the particular embodiments previously described, 1096 sample images included in a CorelDRAW™ Version 10.0 software CD#3 for experiments were employed. Images include Nature, Ocean, Food, Animals, Architecture, Places, Leisure and Misc. Five data hiding methods were used: Cox et al.'s non-blind spread spectrum (SS), Piva et al's blind SS, Huang and Shi's 8-by-8 block based SS, a generic Quantization Index Modulation (QIM) method, and a generic LSB method. See I. J. Cox, J. Kilian, T. Leighton and T. Sharnoon, Secure Spread Spectrum Watermarking for Multimedia, IEEE Trans. on Image Processing, 6, 12, 1673-1687, (1997); C. M. Bishop, Neural Network for Pattern Recognition, Oxford, N.Y., 1995; A. Piva, M. Barni, E Bartolini, V. Cappellini, "DCT-based Watermark Recovering without Resorting to the Uncorrupted Original Image", Proc. ICIP 97, vol. 1, pp. 520; J. Huang and Y. Q. Shi, "An adaptive image watermarking scheme based on visual masking," IEEE Electronic Letters, vol. 34, no. 8, pp. 748-750, April 1998; B. Chen and G. W. Wornell, "Digital watermarking and information embedding using dither modulation", Proceedings of IEEE MMSP 1998, pp 273-278. For an image in the CorelDRAW™ image database, five stego-images were respectively generated by these five data hiding methods.

For Cox et al's method, the embedding strength employed is $\alpha=0.1$. For the QIM method, several middle frequency block DCT coefficients were selected for data hiding. The payload is 0.1 bpp (bit per pixel). For the generic LSB method, both the pixel position used for embedding data and the bits to be embedded were randomly selected. For the data hiding methods, a different randomly selected signal was embedded into a different image.

First, the system is evaluated using one of the five data hiding methods at a time. A group of randomly selected 896 original images and the corresponding 896 stego-images were used for training. The remaining 200 pairs of cover images and stego-images were put through the trained neural network to evaluate performance. The detection rate is defined here as the ratio of the number of the correctly classified images with respect to the number of the overall test images. The average of 10-time test results is listed in FIG. 13.

Second, the five data hiding methods were combined to evaluate blind steganalysis ability. As with the above, 1096 6-tuple images were employed. A 6-tuple image here comprises an original image and five stego-images generated by the five data hiding methods. Then, 896 6-tuple images were randomly selected for testing. And, the remaining 200 6-tuples were used for testing. Again, the 10-time average detection rates are listed in FIG. 13. Test results of Farid's method and Harmsen's method were also evaluated under similar circumstances for purposes of comparison. The results are also provided in FIG. 13.

Third, another data hiding method, which was not been used in the training process, was tested. HIDE4PGP was applied to 200 randomly selected images, and the resulting detection rate was 99.5%.

Figures 14, 15, 16:
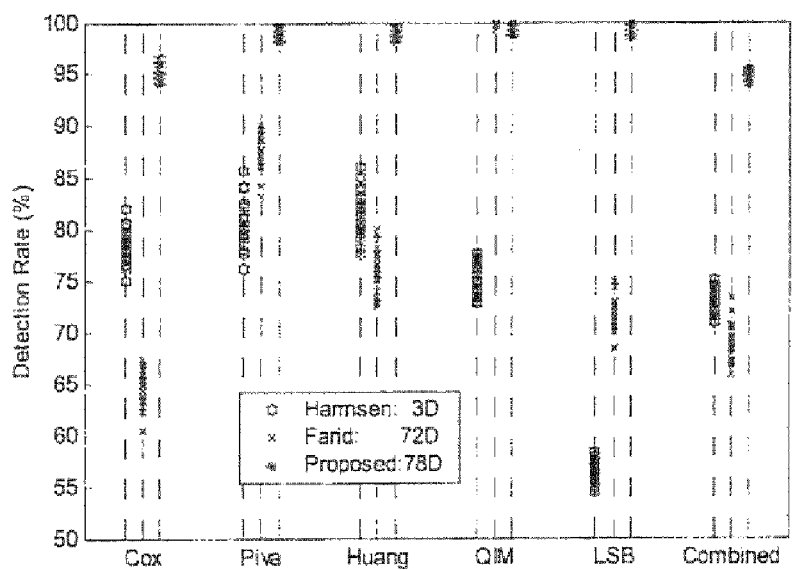
FIG. 14 is a data table comparing results obtained for features of original images with those of prediction-error images.
FIG. 15 is data table comparing results obtained using a neural network classifier with results obtained using a Bayes classifier.
FIG. 16 is a graph of detection rates with a 78-dimensional feature vector using a Bayes classifier, averaged over 30 tests.

Fourth, to evaluate the effectiveness of using a prediction-error image, the 39 features generated from original images and the 39 features obtained from prediction-error images were separated and a similar evaluation was conducted. FIG. 14 illustrates the comparison results, which demonstrate the effectiveness of using prediction-error images.

Figure 17:
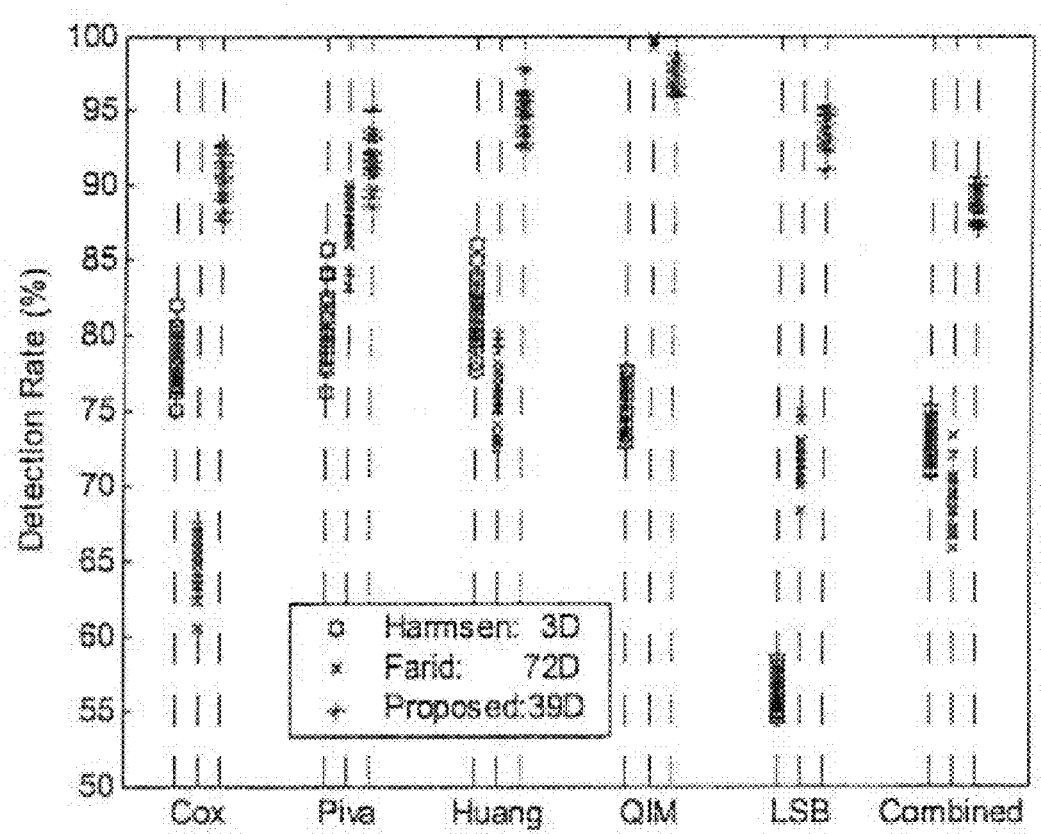
FIG. 17 is a graph of detection rates with a 39-dimensional feature vector obtained using a Bayes classifier, averaged over 30 tests.

Finally, experiments were conducted with the disclosed 78-D feature vectors but also using a Bayes classifier and a neural network classifier for the five data hiding methods individually and jointly. FIG. 15 illustrates the "detection rate" for Cox et al.'s SS data hiding method and for a method including a combination of five data hiding methods. Experimental results were obtained using the Bayes classifier as well, even though the detection rates may be slower than those obtained using a neural network classifier. Graphical illustrations of detection rates (averaged over 30-time tests) are shown in FIGS. 16 and 17.

It will, of course, be understood that, although particular embodiments have just been described, the claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Likewise, although claimed subject matter is not limited in scope in this respect, one embodiment may comprise one or more articles, such as a storage medium or storage media. This storage media, such as, one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive. For example, a display may be employed to display one or more queries, such as those that may be interrelated, and or one or more tree expressions, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well known features were omitted and/or simplified so as not to obscure the claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

What is claimed is:

1. A method for steganalysis of an image, comprising:
   generating a prediction-error image from a gray-scale image corresponding to the image;
   computing at least one discrete wavelet transform (DWT) of at least one image selected from the group consisting of the gray-scale image and the prediction-error image;
   computing moments for multiple sub-bands associated with the at least one DWT, wherein computing moments is based on histograms of the multiple sub-bands;
   using the moments to provide input features for one or more classifiers configured to detect changes in the histograms that indicate if there is hidden data in the image.

2. The method of claim 1, wherein the gray-scale image is obtained from said image by computing an irreversible transform.

3. The method of claim 1, wherein the at least one DWT is a three-level Haar wavelet transform.

4. The method of claim 1, wherein generating the prediction-error image further comprises:
   generating a predicted image of the gray-scale image using an image prediction algorithm; and
   computing the prediction-error image as a difference between elements (x) of the gray-scale image and elements ($\hat{x}$) of the predicted image of the gray-scale image,
   wherein outputs of the image prediction algorithm are determined in accordance with a prediction context and an expression for the predicted image is given by:

$$\hat{x} = \begin{cases} \max(a, b) & c \leq \min(a, b) \\ \min(a, b) & c \geq \max(a, b) \\ a + b - c & \text{otherwise.} \end{cases}$$

5. The method of claim 4, wherein the prediction context defines locations of positions (a, b, c) relative to the elements (x) of the gray-scale image in accordance with the position chart shown in FIG. 1.

6. The method of claim 1, wherein the computing moments ($M_n$, further comprises:
   computing the moments in accordance with an expression given by:

$$M_n = \sum_{j=1}^{N/2} f_j^n |H(f_j)| \Big/ \sum_{j=1}^{N/2} |H(f_j)|,$$

where n =1, 2 and 3, $H(f_j)$ is a characteristic function component at a frequency $f_j$, and N is the total number of points in a horizontal axis of the histogram associated with a sub-band for which the moments are being computed.

7. The method of claim 1, wherein using the moments comprises analyzing the moments for detecting changes in a degree of flatness of the histograms for one or more of the DWT sub-bands $LL_i$, where i =1, 2, 3.

8. The method of claim 1, wherein using the moments comprises analyzing moments for changes at peaks of one or more of the histograms for the DWT sub-bands $LH_i$, $HL_i$, and $HH_i$, where i =1, 2, 3.

9. The method of claim 1, wherein using the moments as input features comprises:
  applying the input features to a trained classifier selected from the group consisting of a trained neural network classifier, a trained Support Vector Machine classifier and a trained Bayes classifier.

10. The method of claim 1, wherein using the moments to provide input features comprises:
  applying the input features to a trained classifier;
  and wherein the method further comprises:
  obtaining the trained classifier by training a classifier using features obtained from a set of training images by applying said generating a prediction-error image, said computing at least one discrete-wavelet transform, and said computing moments.

11. An article of manufacture comprising a computer-readable medium having instructions stored thereon that, if executed by a computing device, cause the computing device to implement a method for steganalysis of an image, the method comprising:
  generating a prediction-error image from a gray-scale image corresponding to the image;
  computing at least one discrete wavelet transform (DWT) of at least one image selected from the group consisting of the gray-scale image and the prediction-error image;
  computing moments for multiple sub-bands associated with the at least one DWT, wherein computing moments is based on histograms of the multiple sub-bands;
  using the moments to provide input features for one or more classifiers configured to detect changes in the histograms that indicate if there is hidden data in the image.

12. The article of claim 11, wherein the gray-scale image is obtained from said image by computing an irreversible transform.

13. The article of claim 11, wherein the at least one DWT is a three-level Haar wavelet transform.

14. The article of claim 11, wherein generating the prediction-error image further comprises:
  generating a predicted image of the gray-scale image using an image prediction algorithm; and
  computing the prediction-error image as a difference between elements (x) of the gray-scale image and elements ($\hat{x}$) of the predicted image of the gray-scale image, wherein outputs of the image prediction algorithm are determined in accordance with a prediction context and an expression for the predicted image is given by:

$$\hat{x} = \begin{cases} \max(a, b) & c \leq \min(a, b) \\ \min(a, b) & c \geq \max(a, b) \\ a + b - c & \text{otherwise} \end{cases}.$$

15. The article of claim 14, wherein the prediction context defines locations of positions (a, b, c) relative to the elements (x) of the gray-scale image in accordance with the position chart shown in FIG. 1.

16. The article of claim 11, wherein the computing moments ($M_n$), further comprises:
  computing the moments in accordance with an expression given by:

$$M_n = \sum_{j=1}^{N/2} f_j^n |H(f_j)| \Big/ \sum_{j=1}^{N/2} |H(f_j)|,$$

where n =1, 2 and 3, $H(f_j)$ is a characteristic function component at a frequency $f_j$, and N is the total number of points in a horizontal axis of the histogram associated with a sub-band for which the moments are being computed.

17. The article of claim 11, wherein using the moments comprises analyzing the moments for detecting changes in a degree of flatness of the histograms for one or more of the DWT sub-bands $LL_i$, where i =1, 2, 3.

18. The article of claim 11, wherein using the moments comprises analyzing moments for changes at peaks of one or more of the histograms for the DWT sub-bands $LH_i$, $HL_i$, and $HH_i$, where i =1, 2, 3.

19. The article of claim 11, wherein using the moments to provide input features comprises:
  applying the input features to a trained classifier selected from the group consisting of a trained neural network classifier, a trained Support Vector Machine classifier and a trained Bayes classifier.

20. The article of claim 11, wherein using the moments to provide input features comprises:
  applying the input features to a trained classifier;
  and wherein the method further comprises:
  obtaining the trained classifier by training a classifier using features obtained from a set of training images by applying said generating a prediction-error image, said computing at least one discrete-wavelet transform, and said computing moments.

21. An apparatus for analyzing an image, the apparatus comprising:
  a wavelet decomposition component configured to compute at least one discrete wavelet transforms (DWT) of at least one image selected from the group consisting of a gray-scale image corresponding to the image and a prediction-error image corresponding to the image;
  a feature extraction component configured to compute moments for multiple sub-bands associated with the at least one DWT, wherein the moments are based on histograms of the multiple sub-bands; and
  at least one classifier configured to use input features based on the moments to detect changes in the histograms that indicate if there is hidden data in the image.

22. The apparatus of claim 21, wherein the gray-scale image is obtained from said image by computing an irreversible transform.

23. The apparatus of claim 21, wherein the at least one DWT is a three-level Haar wavelet transform.

24. The apparatus of claim 21, wherein the prediction-error image is obtained from said image by:
  generating a predicted image of the gray-scale image using an image prediction algorithm; and
  computing the prediction-error image as a difference between elements (x) of the gray-scale image and elements ($\hat{x}$) of the predicted image of the gray-scale image, wherein outputs of the image prediction algorithm are determined in accordance with a prediction context and an expression for the predicted image is given by:

$$\hat{x} = \begin{cases} \max(a,b) & c \leq \min(a,b) \\ \min(a,b) & c \geq \max(a,b) \\ a+b-c & \text{otherwise.} \end{cases}$$

25. The apparatus of claim 24, wherein the prediction context defines locations of positions (a, b, c) relative to the elements (x) of the gray-scale image in accordance with the position chart shown in FIG. 1.

26. The apparatus of claim 21, wherein the feature extraction component is configured to compute moments ($M_n$) by computing moments in accordance with an expression given by:

$$M_n = \sum_{j=1}^{N/2} f_j^n |H(f_j)| \Big/ \sum_{j=1}^{N/2} |H(f_j)|,$$

where n =1, 2 and 3, $H(f_j)$ is a characteristic function component at a frequency $f_j$, and N is the total number of points in a horizontal axis of the histogram associated with a sub-band for which the moments are being computed.

27. The apparatus of claim 21, wherein the at least one classifier is further configured to analyze the moments for detecting changes in a degree of flatness of the histograms for one or more of the DWT sub-bands $LL_i$, where i =1, 2, 3.

28. The apparatus of claim 21, wherein the at least one classifier is further configured to analyze the moments for changes at peaks of one or more of the histograms for the DWT sub-bands $LH_i$, $HL_i$ and $HH_i$, where i =1, 2, 3.

29. The apparatus of claim 21, wherein the at least one classifier comprises a trained classifier selected from the group consisting of a trained neural network classifier, a trained Support Vector Machine classifier and a trained Bayes classifier.

30. The apparatus of claim 21, wherein the at least one classifier comprises a trained classifier trained using features obtained from a set of training images by:
generating a prediction-error image from a gray-scale image corresponding to each training image;
computing at least one discrete wavelet transform (DWT) of at least one image selected from the group consisting of the gray-scale image and the prediction-error image;
computing moments for multiple sub-bands associated with the at least one DWT, wherein computing moments is based on histograms of the multiple sub-bands.

31. An apparatus for analyzing an image, comprising:
means for generating a prediction-error image from a gray-scale image corresponding to the image;
means for computing at least one discrete wavelet transform (DWT) of at least one image selected from the group consisting of the gray-scale image and the prediction-error image;
means for computing moments for multiple sub-bands associated with the at least one DWT, wherein computing moments is based on histograms of the multiple sub-bands;
means for classifying, configured to use features based on the moments and configured to detect changes in the histograms that indicate if there is hidden data in the image.

* * * * *